United States Patent
Hsiao

(10) Patent No.: US 8,451,013 B1
(45) Date of Patent: May 28, 2013

(54) INSULATED FIBER SENSOR APPARATUS AND METHOD

(76) Inventor: Kuang-Ting Hsiao, Mobile, AL (US)

( * ) Notice: Subject to any disclaimer, the term of this patent is extended or adjusted under 35 U.S.C. 154(b) by 256 days.

(21) Appl. No.: 12/799,650

(22) Filed: Apr. 29, 2010

Related U.S. Application Data

(60) Provisional application No. 61/214,988, filed on Apr. 30, 2009.

(51) Int. Cl.
*G01R 27/08* (2006.01)
*G01R 27/00* (2006.01)
*G01R 27/02* (2006.01)
*H01C 1/02* (2006.01)

(52) U.S. Cl.
USPC ........... 324/691; 324/600; 324/609; 324/693; 338/226

(58) Field of Classification Search
USPC ............ 73/760, 768; 442/229, 256; 324/71.1, 324/691; 428/357, 364, 365, 408, 375, 379; 447/5, 52, 199, 200, 229
See application file for complete search history.

(56) References Cited

U.S. PATENT DOCUMENTS

| | | | |
|---|---|---|---|
| 3,779,071 A | 12/1973 | Thomas, Jr. et al. | |
| 4,249,423 A | 2/1981 | Viertl et al. | |
| 5,379,644 A | 1/1995 | Yanagida et al. | |
| 5,528,155 A * | 6/1996 | King et al. | 324/713 |
| 5,826,453 A | 10/1998 | Prevey, III | |
| 6,072,568 A | 6/2000 | Paton et al. | |
| 6,277,771 B1 | 8/2001 | Nishimura et al. | |
| 6,353,656 B1 | 3/2002 | LeVert et al. | |
| 6,478,875 B1 | 11/2002 | Sampath et al. | |
| 7,027,672 B2 * | 4/2006 | Tjin | 385/13 |
| 7,419,651 B2 * | 9/2008 | Smalley et al. | 423/447.2 |
| 7,466,879 B2 * | 12/2008 | Tjin | 385/13 |
| 8,092,897 B2 * | 1/2012 | Honma et al. | 428/142 |
| 2006/0110599 A1* | 5/2006 | Honma et al. | 428/413 |

OTHER PUBLICATIONS

Xiaojun Wang, Xuli Fu, and D.D.L. Chung, Strain sensing using carbon fiber, Mar. 1999, Journal of materials Research, vol. 14, No. 3 pp. 790-802.*
Xiaojun Wang and D.D.L. Chung, Piezoresistive behavior of carbon fiber in epoxy, 1997, Carbon, col. 35, No. 10-11, pp. 1649-1651.*
Xiaojun Wang and D.D.L. Chung, Electromechanical Behavior of Carbon Fiber, 1997, Composite Materials Research Laboratory, State University of New York at Buffalo, pp. 452-453.*

* cited by examiner

*Primary Examiner* — Patrick Assouad
*Assistant Examiner* — Christopher McAndrew
(74) *Attorney, Agent, or Firm* — J. Nevin Shaffer, Jr.

(57) ABSTRACT

An insulated fiber sensor apparatus is used in a composite that includes a number of fibers in a matrix. An insulated fiber is connected with the composite and is covered with insulation such that the insulation separates the insulated fiber from the matrix and from the number of fibers in the matrix. Further, a measurement device is connected with the insulated fiber. According to one aspect of the invention, the fibers are carbon fibers.

18 Claims, 2 Drawing Sheets

INSULATED FIBER SENSOR APPARATUS AND METHOD

CROSS REFERENCE TO RELATED APPLICATION

This application claims the benefit of previously filed U.S. provisional patent application No. 61/214,988 filed Apr. 30, 2009 for a "Novel carbon fiber sensor for in-situ carbon fiber strain monitoring". The Applicant hereby claims the benefit of this provisional application under 35 U.S.C. §119. The entire content of this provisional application is incorporated herein by this reference.

FIELD OF THE INVENTION

This invention relates to an insulated fiber sensor apparatus and method. In particular, in accordance with one embodiment, the invention relates to an insulated fiber sensor apparatus in a composite including a number of fibers and a matrix. An insulated fiber is connected with the composite and is covered with insulation such that the insulation separates the insulated fiber from the matrix and from the number of fibers in the matrix. Further, a measurement device is connected with the insulated fiber. According to one aspect of the invention, the fibers are carbon fibers.

BACKGROUND OF THE INVENTION

Composite materials (or composites for short) are engineered materials made from two or more constituent materials with significantly different physical or chemical properties which remain separate and distinct on a microscopic level within the finished structure. Fiber reinforced composites are composed of fibers dispersed across a matrix system. The matrix can be polymer, ceramics, metal, or graphite. The fiber carries the load due to its high strength and high modulus and the matrix maintains the fiber(s) in proper position and transfers the load between the fibers. Fiber reinforced composites are well-known in the materials industry and are routinely used in aerospace, sporting goods, energy, medical, and automotive applications due to their superlative mechanical properties, low densities, and sometimes for their thermal and chemical and weather resistance.

Notwithstanding the brilliant theoretical properties of composite materials, the true material properties observed in the real world fall short of those theoretically predicted. Reasons for this can be found but not limited in: (1) the interface between the fiber and the matrix is weaker than the bulk properties of the matrix and the fiber; (2) the fiber sometimes buckles in the micro-scale and cannot take the loading as theoretically expected; (3) manufactured defects of the composites; (4) unexpected loadings (such as bird impact) on the composites that cause undesired and undetected internal damages (such as but not limited to the delamination, matrix crack, interface crack, etc.) on the composites; (5) reversible or irreversible property change of the matrix system due to temperature change or other environmental changes or aging problems; (6) residual stress/strain resulting from the processing and assembly of the composite structure itself or the use of the composite structure in a raised or lowered temperature. In short, there are many different mechanisms for causing the reduction of mechanical performance of composite structures. Importantly, as the major load-carrying system is the fiber, it follows that any change in the load behaviour of the fiber system will also cause a change (typically a reduction) in the mechanical performance of a composite during the service life of a composite structure.

Although there are many prior art ways to measure the total deformation of a composite structure, Applicant has determined that there are not any effective and efficient methods that can measure the deformation (or strain) of a fiber inside a composite during the use of the composite structure. The technical challenge is caused by (1) the typically small micro-size diameter of the fiber, (2) the distinctive thermal and mechanical properties between the fiber and matrix, and (3) the presently unknown and unmeasurable interface behavior between the fiber and the matrix.

One of the major causes of different strains between the fiber and the matrix is residual stress or residual strain. Residual stress is inherently present in almost all composite materials. The residual strain tends to affect both the physical and mechanical characteristics of the composite materials and is responsible for dimensional instability and an increase in damage to and premature failure of the composite. Accordingly, it is imperative that thermal residual stresses be taken into account when designing composite structures, in particular carbon fiber polymer matrix composites.

Analytical modeling of composite structures has evolved tremendously over the past few years. These techniques are applicable to continuous fiber reinforced thermoplastic composites and they provide an estimation of the magnitude of the thermal residual stresses on three (3) levels. On the micro-mechanical level or constituent level the operative parameter turns out to be the mismatch in the coefficient of thermal expansions between the reinforcing fibers and the polymer matrix. This results in compressive residual strains in the fiber and tensile strains in the surrounding polymer matrix, and can also cause macro-mechanical or lamination residual stresses. Such macro-mechanical residual stresses are present on a ply-to-ply scale due to lamina anisotropy (a difference in the transverse and longitudinal ply coefficients of thermal expansion). On a global laminate level, a gradient in cooling rate and temperature throughout the thickness of the composite laminate or structure may result in a residual stress distribution through the thickness of the laminate. These levels may also be referred to as the intralaminar, interlaminar and laminate stresses.

Prior art techniques attempt to evaluate the residual stress of a composite laminate. These techniques can be divided into three categories: first methods using intrinsic composite constituents material properties, second methods employing embedded 'foreign" stress sensors and third techniques based on in-plane and out-of-plane deformations.

Techniques using intrinsic material properties include photo-elasticity which is a well-known optical technique for static stress analysis. For determination of the stress field in composites, however, a transparent or translucent matrix is necessary. This method has been applied to the transparent thermoset matrix composites and amorphous thermoplastic matrices. In amorphous polymers, stress alters the molecular orientation distribution, thereby affecting the polarization state of the light. When seeking to determine the magnitude of the residual stress, the measurement of retardation, i.e., phase difference between two light vectors moving at different velocities, is calculated using Brewster's Law. A disadvantage of this method is the requirement of thin composite layers with low fiber volume.

Another technique for residual strain determination utilizing intrinsic material property is micro-laser Raman spectroscopy. This technique is based on the stress sensitivity of most Raman vibrational modes of crystalline phases. The difference in energy between the incident photon and the Raman scattered proton is equal to the energy of the vibration of the scattering molecule. A plot of intensity of scattered light versus energy difference is a Raman spectrum. Raman spectroscopy is a well known method for measuring the state of strains in carbon fibers embedded in a translucent polymer matrix, since certain peaks positions in the Raman spectrum of the fiber change with applied strain. The "Raman peaks" of the fiber. There is a problem however. The Raman spectra are taken from the laminate surface and fiber surfaces and differences in fiber and laminate skin and core behavior upon straining can and do exist. In addition, certain amorphous fibers have a very week Raman response and can not be readily used as intrinsic stress or strain sensors, for example glass.

In the carbon fiber/polymer matrix composites electrical properties, for example resistance, can also be affected by strain and temperature. Therefore, the electrical resistance of a carbon fiber/polymer matrix can be monitored to indicate strain damage without the requirement for "foreign" sensors. As a result, inter-laminar residual stresses can be determined by measuring electrical resistance of cross ply laminates. It is well known that upon curing of thermoset matrix composites at increased pressure, the electrical conductivity barrier, measured as the activation energy, increased. Thermosetting plastics (thermosets) are polymer materials that irreversibly cure. The cure may be done through heat (generally above 120 degrees Celsius), through a chemical reaction (two-part epoxy, for example), or irradiation such as electron beam processing.

The resin curing can attribute to increased residual interlaminar stress. Due to these stresses, the quality of the interlaminar interface in angle-ply laminates breaks down. If the bond achieved at high temperatures is not sufficient to withstand de-bonding due to thermal stresses formed during subsequent cooling then the consequence is a higher electrical resistance measurement during cooling. The disadvantage of this method is that in order to accurately quantify the residual stresses present more information is required.

Another method to determine and follow thermal strain build up during cooling is to embed strain sensors in the composite itself. Typical sensors used for this purpose include, but are not limited to, strain gauges, fiber optic sensors and embedded metallic particles in combination with X-ray diffraction. A measurable change in properties have been shown by these sensors when exposed to residual thermal strains, to the extent adequate mechanical interaction exists between the composite and the sensor. One example of this technique involves the use of strain gauges to direct measure. Residual strain developments attributable to crystallization effects found in unidirectional laminates (CF/PEEK). In thermset composites, embedded strain gauges have been shown to provide accurate results during both cooling and heating.

It is not uncommon for fiber optic sensors to be utilized as internal "strain gauges" to follow the development of thermal residual strains within a composite laminate, particularly when processing during the high temperatures required for thermoplastic composites. This technique can also be applied to unidirectional laminates as well in angle ply laminates.

A number of different fiber optic sensors are available for use in this technique, for example the fiber Bragg grating (FBG) and the extrinsic Fabry-Perot interfermettic (EFPI) sensors. An EFPI sensor measures strain through a change in cavity length, which is related to a phase change between the input/output signals and the reflection of the optical fibers. The disadvantage of this method is that a cavity (and, as a consequence, a weakness) is included in the laminate and the diameter of the sensor is so large that stress concentrations may arise. Furthermore, the EFPI sensor is prone to failure caused by thermal residual stresses alone.

FBG sensors show much greater promise for monitoring residual strain because their diameters are small and accurate. The FBG sensor operates on the response to strain and temperature differences by a change in Bragg wavelength. The reflection spectra of the optical sensors may split into two peaks due the non-axisymmetric residual stresses in the composite. As a result, polarization effects and strain differences throughout the length of specimen can be detected. Wave length changes can be used to determine thermal residual strains with relations based on the photoelastic constant and effective refraction index of the optic fiber. The disadvantage of utilizing optic fiber sensors is that when it is embedded perpendicular to the fiber, an eye-shaped defect results thereby causing a significant stress concentration and decrease in mechanical properties.

Another of the "embedded sensor" techniques includes using X-ray techniques on metallic particle inclusions in the matrix and thereby measuring the diffraction imposed by residual strains in the polymer matrix. Embedded metal particles, such as copper, aluminum or silver, show a deflection in peak angle when embedded in a composite. Utilizing Braggs law, this deflection is related to a change in crystal lattice spacing caused by the residual strain. The measured strain can be related to the residual stress in the polymer matrix using Hooks law. Intralaminar and interlaminar residual strain detection in unidirectional laminate has been found to be possible. Typically this type of technique is used with thermoset matrix materials due to the fact that thermosets do not have crystallized structure that changes in response to X-rays when strained and therefore require crystalline fillers. However, in semi-crystalline thermoplastic, the lattice spacing between the crystals and the change due to straining can be followed by means of X-ray diffraction. The key disadvantage of this technique is that it either gives information on the surface properties of the sample only or, at best, only a thin portion of the sample.

Some prior art techniques for measuring residual stress in composites are based on in-plane and out-plane and out-of plane deformations. One of these methods is known as an interferometry-based method. This method uses the phenomenon of interference of light waves reflecting from a sample. This interference causes a visual fringe pattern that can be used to determine deformations. Some interference-based methods have been used to determine residual stress formation in composites. A well-known effect in optics is the Moire effect. It is based on an interference pattern that develops when light passes through two gratings that are rotated over a small angle with respect to one another. When one of the gratings changes due to deformation of the sample, the resulting interference pattern will change as well. This type of interference can be used for measuring displacements, both in-plane and out-of-plane. For measuring in-plane displacement, a grating should be applied to the surface of the sample. The grating can be projected onto the surface at an angle to the viewing direction.

The cure reference method was developed to determine the thermal strain development in thermoset composites with Moire interferometry. This method is a full-field laser based optical technique of Moire Interferometry to monitor strains on the surface of the thermoset laminate that initiate during cooling. The grating, which is applied during consolidation, acts as a reference to the stress free conditions prior to the stress free temperature. A characteristic pattern of light and dark fringes results. This pattern can be used to determine the in-plane displacements in symmetric laminates from which the residual can be calculated. Although accurate, this method only gives information of the residual strain state on the surface. In addition, an interference image needs to be captured when no strains are present.

A common manifestation of residual stress is warping of laminates with unsymmetrical lay-up. Accordingly, the use of unsymmetrical cross-ply or angle ply laminate can be used to determine the magnitude of the residual stresses of plies, the reason being that these residual stresses can partially be relieved by out-of-plane deformation. The out-of-plane deformations of a cross-ply or angle-ply laminate can be monitored during or after cooling from the processing temperature. The higher the curvature for a certain laminate with a particular thickness, the higher the residual stresses. At a certain temperature, the residual stress that would exist perpendicular to the fiber in a corresponding symmetrical cross-ply laminate can be calculated from the curvature, based on linear lamination theory.

Another approach is to compare the obtained curvatures with curvature predictions based on classical lamination theory. When the theory can accurately predict the curvatures, it may be assumed that the calculated residual stresses are also accurate and also that appropriate thermelastic properties of each lamina were used, including composite stiffness characteristics, thermal expansion coefficients and the difference between the service temperature and the temperature at which residual stresses start to build up. One drawback of the curvature method is that values of curvature may show variations for equal laminates under similar conditions.

Patents relevant to measuring thermal residual stress include: Viertl, et al, U.S. Pat. No. 4,249,423, which discloses residual stress measurements made using a strain gage and stress relief; Paton, et al., U.S. Pat. No. 6,072,568, which relates to a non-destructive measurement method for determining residual stress proximate an intermediate layer in a multilayer thermal barrier coating system; LeVert, et al., U.S. Pat. No. 6,353,656, disclosing a radioisotope based x-ray residual stress analysis apparatus having a shielded, monoenergetic radioisotopic source to emit x rays for measurement of the stress state of a polycrystalline material; Sampath, et al. U.S. Pat. No. 6,478,875; relates to an apparatus for performing in-situ curvature measurement of a substrate during a deposition process which includes a clamp for retaining the substrate near one end while leaving the opposite end free; and Prevey, III, U.S. Pat. No. 5,826,453 which relates to utilizing a single-point burnishing process to provide deep compression with a minimal amount of cold working and surface hardening. In particular, the area to be burnished along the surface of a workpiece is defined and a freely rotating burnishing ball is forced against the surface of the workpiece to produce a zone of deformation having a deep layer of compression within the surface.

Other patents of which the Applicant is aware include: U.S. Pat. No. 3,779,071 to Thomas Jr., et al. discloses a conductive wire based fatigue strain gauge including glass fibers in a resin matrix glass fiber composite; U.S. Pat. No. 5,379,644 to Yanagida discloses a bundled carbon fiber strain gauge consisting of many carbon fibers that are simply included in the matrix and is thus unable to distinguish or isolate themselves from surrounding fibers; and U.S. Pat. No. 6,277,771 to Nishimura discloses a carbon fiber and metal wire form sheet where the wire is not more than four percent and the wire is insulated.

Hence, it is clear that the prior art as extensive as it is still lacks: (1) an in-situ sensor method to experience the strain that can effectively represent the strain of the micro-diameter fiber during the use of the composite structure at different temperatures (2) an in-situ sensor to measure the residual stress of a composite caused by the manufacturing process and (3) an in-situ sensor to monitor the composite performance and health during the service life of a composite structure.

It, therefore, is an object of this invention to provide an insulated fiber sensor apparatus and method that is part of a composite material, including both the fiber system and the matrix system, but separate from it and yet which is sufficiently close to the dimension of the fibers in the matrix that it does not create voids or weaknesses in the matrix. It is a further object of the invention to provide an insulated fiber sensor that when connected with a measurement device provides the user with real time in-situ data concerning strain, temperature and compression.

SUMMARY OF THE INVENTION

Accordingly, the insulated fiber sensor apparatus of the present invention, according to one embodiment includes a composite formed by a large number, or plurality, of fibers in a matrix. An insulated fiber, connected with the composite, is covered with insulation such that the insulation separates the insulated fiber from the matrix and from the plurality of fibers. A measurement device is connected with the insulated fiber.

In one aspect, the plurality of fibers are carbon fibers. In another aspect, the insulated fiber is a carbon fiber. In a further aspect, the measurement device measures electrical resistance. In another aspect, each of the plurality of fibers has a first diameter that is approximately the same for each fiber and the insulated fiber has a second diameter and the insulation increases the second diameter of the insulated fiber to less than eleven times the first diameter of the plurality of fibers.

In another aspect of this invention, more than one insulated fiber is provided. In a further aspect, the more than one insulated fibers are located in different locations within the composite and are oriented in different directions than the plurality of fibers.

In yet another aspect, a reference strain source is connected with the composite, the matrix or plurality of fibers or both, and in another aspect a temperature measurement device connected with the composite, the plurality of fibers or the matrix or both.

According to another embodiment, an insulated carbon fiber sensor apparatus includes a composite formed by a plurality of carbon fibers in a matrix wherein each of the plurality of fibers has a first diameter that is approximately the same for each fiber. An insulated carbon fiber, connected with the composite, is covered with insulation such that the insulation separates the insulated carbon fiber from the matrix and from the plurality of carbon fibers and wherein the insulated carbon fiber has a second diameter and wherein the insulation increases the second diameter of the insulated carbon fiber to approximately less than eleven times the first diameter of the plurality of carbon fibers. An electrical resistance measurement device is connected with the insulated carbon fiber.

Another aspect of this invention includes more than one insulated carbon fiber. In one aspect, the more than one insulated carbon fibers are located in different locations within the composite and are oriented in different directions than the plurality of carbon fibers. In another aspect, the invention includes a reference strain source connected with the composite. In a further aspect, a temperature measurement device is connected with the composite. In yet another aspect, the insulated carbon fiber is connected with the composite by one of a group of connections consisting of: being attached with the surface of the composite or being embedded within the composite.

In one aspect, the invention further includes a database that contains measurements of the insulated carbon fiber sensor prior to connection with the composite for comparison of measurements from the composite and measurements from the insulated carbon fiber sensor after connection with the composite.

According to another embodiment of the invention, an insulated fiber sensor method includes the steps of:

a. providing a composite consisting of plurality of fibers in a matrix, an insulated fiber, connected with the composite, covered with insulation such that the insulation separates the insulated fiber from the matrix and from the plurality of fibers and a measurement device connected with the insulated fiber wherein the measurement device is conformed to measure electrical resistance; and b. collecting measurements from the measurement device.

In another aspect of this invention, the method further includes a database wherein the database includes measurements of the insulated fiber sensor prior to connection with the composite for comparison of measurements from the composite and measurements from the insulated fiber sensor after connection with the composite.

In one aspect, the method further includes a reference strain source connected with the composite and a temperature measurement device connected with the composite wherein data from the reference strain source and data from the temperature measurement device are collected in the database. In another aspect, the data from the database is used to provide realtime data about strain, temperature and compression of the matrix and the plurality of fibers.

DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE INVENTION

Definitions

Terms as Used Herein:
The term "in-situ" is defined as the event occurs and is measured at nearly the exact or exact physical location of the fiber sensor in the composite.
The term "micro-level" is defined as the scope of length scale the same or nearly the same as the fiber whose diameter is of micrometer scale.
The term "carbon fiber" is defined as the fiber made of nearly pure carbon or graphite and its diameter is of micrometer scale.
The term "sensor" is defined as an apparatus and method for detecting or measuring physical changes of an object or system.

The term "coating" is defined as a thin layer of polymer, ceramic, glass, diamond or the like, deposited on the fiber.
The term "insulation layer" is defined as the polymer coating, ceramic, glass, diamond or the like, deposited on the fiber to prevent electrical current leak from being conducted between the coating insulated fiber and its surroundings.
The term "strain" is defined as the change in distance between two material points caused by external force(s) or field(s) divided by the original distance between the two material points before external force(s) or field(s) are applied.
The term "monitoring" is defined as to continuously, or nearly so, measure or scan events that occur on an object or system.
The term "recording" is defined as registering the measured results of events that occur on an object or system.

Figure 1:
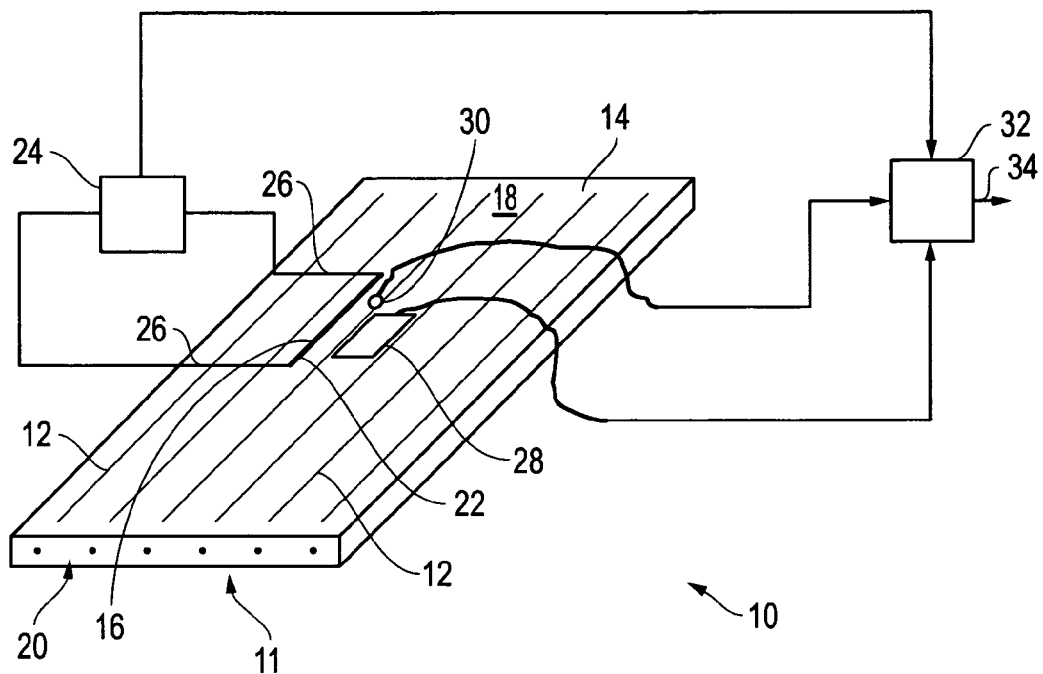
FIG. 1 is a perspective schematic view of the insulated fiber sensor according to one embodiment.
Figure 2:
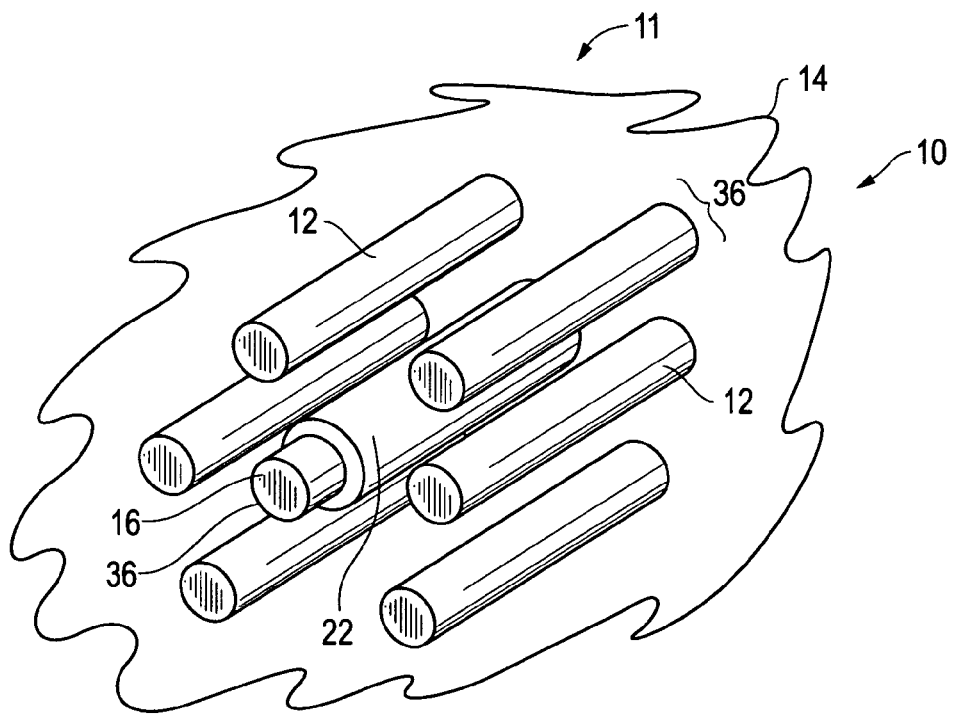
FIG. 2 is an expanded representative view of fibers surrounding the insulated fiber sensor of the invention of FIG. 1.
Figure 3:
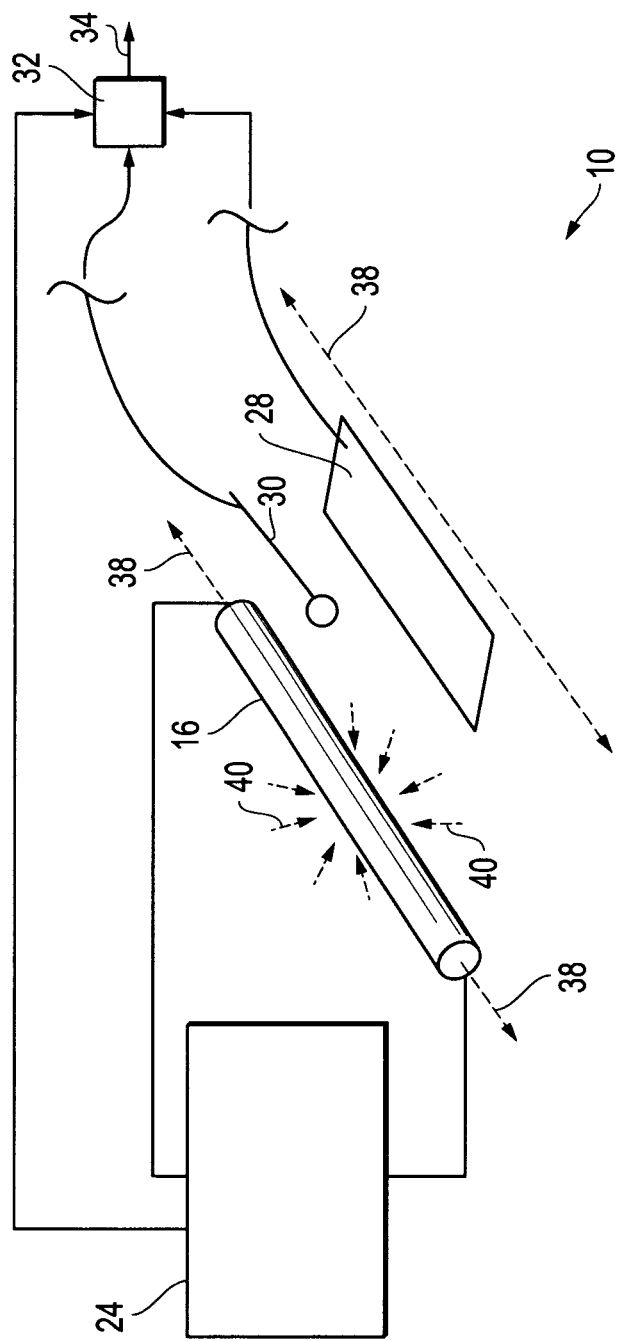
FIG. 3 is a schematic view of the invention of FIG. 1 showing the measurement of strain, compression and temperature by the invention of FIG. 1.

The preferred embodiment of the present invention is illustrated by way of example in FIGS. 1-3. With specific reference to FIG. 1, the insulated fiber sensor 10, according to one embodiment of the present invention, includes a composite 11 formed by the combination of at least one fiber 12 in a matrix 14. As discussed above, a large number of fibers 12 are held together by and in matrix 14 and form the resulting composite 11. In a preferred embodiment fiber 12 is a carbon fiber. The matrix 14 may be any matrix material now known or hereafter developed such as polymer, ceramics, metal or graphite, for example only and not by way of limitation.

Insulated fiber 16 (as best seen in FIG. 2) is connected with composite 11. That is, insulated fiber 16 may be located on the surface 18 of the composite 11, matrix 14, or embedded within the interior 20 of the composite 11, matrix 14. Or insulated fiber 16 may be surrounded or bundled within a group of fibers 12 as shown in FIG. 2 and the group contained within matrix 14.

Insulated fiber 16 is covered by insulation 22. Insulation 22 isolates insulated fiber 16 from direct contact with matrix 14 and/or fibers 12. Importantly, Applicant has determined that the thickness of insulation 22 is critical to the proper performance of the invention. The insulation 22 can not be too thick or it will fail to provide accurate and usable in-situ data. Thus, by experimentation, Applicant has determined that the preferred thickness of the insulation 22 is less than approximately five times the diameter of fibers 12 as more clearly illustrated in FIG. 2. Said another way, the diameter of the insulation 22 is preferably less than approximately eleven times the diameter of the fibers 12.

Still referring to FIG. 1, measurement device 24 is connected with the insulated fiber 16. Measurement device 24 is preferably an electrical resistance measurement device such as a mulitmeter, for example only and not by way of limitation. Connection is made by any means now known or hereafter developed such as wires 26 from the insulated fiber 16 as illustrated.

FIG. 1 also illustrates other features of the invention including a reference strain source 28 and a temperature measurement device 30. The reference strain source can be any suitable strain measurement device such as a strain gage, for example only and not by way of limitation. Likewise, temperature measurement device 30 can be any suitable temperature measuring device such as a thermocouple, for example only and not by way of limitation. Both the reference strain source 28 and the temperature measurement device 30 may be connected with the surface 18 or embedded within the interior 20 of composite 11 or matrix 14. Preferably they are both located in proximity to the insulated fiber 16.

Still referring to FIG. 1, database 32 is illustrated. Database 32 receives data from measurement device 24, reference strain source 28 and temperature measurement device 30. Preferably, measurements of the electrical properties of the fiber 12, matrix 14 and insulated fiber 16 are collected prior to installation of insulated fiber 16. Post connection data is also collected to create a baseline. Thereafter, fluctuations of data can be interpreted accurately to indicated the strain, temperature and compression occurring on the insulated fiber 16 within the composite 11 or matrix 14 in-situ and in real time.

Database 32 is any suitable database system now known or hereafter developed such as a computer system for receiving, storing and manipulating data by a user and for delivery to the user by output 34 to the user. Output 34 may be any means for transmitting data to a user, either wired or wireless, as is known in the art and not described more fully hereafter.

Referring now to FIG. 2, a representative view of the interaction of insulated fiber 16 with fibers 12 is shown. Here, insulated fiber 16 is embedded within a group of fibers 12 and the matrix 14 of composite 11. Again, it is entirely within the scope of the invention for insulated fiber 16 to be secured to the surface 18 of composite 11 or matrix 14 as discussed above. Embedding insulated fiber within a bundle of fibers 12 though has the advantage of providing very relevant data in-situ and in real time for a large number of fibers 12.

FIG. 2, also illustrates the preferred embodiment of the invention in which fibers 12 have a diameter 36. Insulated fiber 16 is, preferably, a fiber that is the same as or similar to fiber 12 in all respects including diameter 36. As shown, the thickness of insulation 22 is clearly less than approximately five times the diameter 36 of the fiber 12. This, again, Applicant has discovered is a critical element for ensuring real time, in-situ measurements of what is occurring in and around fibers 12 while effectively eliminating "noise" from the surrounding fibers 12.

Referring now to FIG. 3, a schematic representation illustrates the novel feature of the insulated fiber sensor 10 of the present invention to provide data to database 32 relevant to the strain, temperature and compression of insulated fiber 16 and surrounding fibers 12. Axial strain along line 38 is transmitted to measurement device 24 for insulated fiber 16 and for reference strain source 28. Axial strain also results in a change in compression strain as indicated by compression arrows 40 on insulated fiber 16. This data is also sent via measurement device 24 to database 32 such that compression forces on fibers 12 and matrix 14 are also closely approximated.

FIG. 3 also illustrates the important inclusion of temperature information collected by temperature measurement device 30. The electrical resistance of insulated fiber 16 varies with temperature, and many forms of fiber 12 and matrix 14 require accurate temperature information. That is, when the axial strain is known and the temperature is known, the radial compression strain can be determined from the change in the electrical resistance detected by measurement device 24.

By way of further discussion, it is known that carbon fiber has moderate electrical resistance and the electrical resistance of a carbon fiber will respond to its strain linearly. As a result, it could be potentially a strain sensor itself. However, different from the typical strain gage materials such as Constantan alloy, carbon fiber's electrical resistance also depends on temperature. Meanwhile, another less familiar and less understood fact of carbon fiber observed in Applicant's experiments is that its Gage Factor (GF=Dimensionless Resistance Change/Change of Strain) actually also changed after the curing process when a single carbon fiber was cured in polymer matrix. For example, a single T-300 carbon fiber has a Gage Factor about 2 for a bare carbon fiber in air and about 0.5 in one cured epoxy matrix (epon862-curing agent W). Others have reported the Gage Factor of a T-300 carbon is about 2 in air and about −17 in a different type of cured epoxy matrix (epon9405-curing agent 9470). Despite the different gage factors for different surrounding matrix, the relationship of the carbon fiber electrical resistance change to the strain on the carbon fiber is always very linear for all experiments. Therefore, in order to use carbon fiber as a strain sensor for its own micro-level strain monitoring, a new method and a new apparatus that are more sophisticated than typical strain gage are presented herewith.

By way of additional explanation, the insulated fiber 16 component consists of two sub-components. Carbon Fiber Equivalent Core (CFEC), insulated fiber 16, which is defined as an electrically conductive fiber with similar diameter and mechanical properties as the fiber 12, carbon fiber for example, used in the composite material. Of course the carbon fiber itself would be a good candidate; however, other conductive fibers such alloy fiber could have the similar diameter and similar mechanical properties of the carbon fiber and could also be used as the CFEC.

Another sub-component is a compatible electrical insulation coating 22 on the CFEC. The CFEC is covered by the compatible electrical insulation coating 22 to form the insulated fiber 16 component. The insulated fiber 16 component is then embedded into the carbon fiber composite, matrix 14, for sensing the strain equivalent to the strain experienced by surrounding carbon fibers 12. In order to have the insulated fiber 16 be compatible with composite and to be able to sense the strain experienced by other neighboring carbon fibers 12, the compatible insulation layer 22 must not be too thick. The thickness of this compatible electrical insulation coating 22, in a preferred embodiment has been determined to be less than five times of the diameter 36 of the neighboring carbon fiber(s) 12 used in the composite 14. Beside the coating thickness requirement, the compatible electrical insulation layer 22 also preferably has compatible mechanical and thermal properties to either the matrix 14 or the carbon fiber 12.

The insulated fiber 16, which again can be either embedded deeply on the inside 20 or embedded on the surface ply lamina 18 of the composite 11, has its two ends connected by wires 26, or the like, to measurement device 24 (such as multimeter) for electrical resistance measurement. Because the insulated fiber 16 acts like a resistor, Applicant has determined that one can also optionally connect multiple insulated fibers 16 in different patterns such as but not limited to in-series connection, parallel connection, or Wheatstone bridge connection.

In order to calibrate the relationship of the electrical resistance of an embedded insulated fiber 16 in a composite 11 with respect to the carbon fiber strain, the electrical resistance change measured from the insulated fiber 16 needs to be correlated to a known reference strain value. For a constant temperature process, this relationship is present by the Gage Factor. For a non-constant temperature process, the electrical resistance is a function of both strain and temperature. Thus, reference strain source 28 provides this reference strain value for calibrating the electrical resistance of insulated fiber(s) 16 embedded in a composite part against the strain at both constant temperature process and non-constant temperature process.

The reference strain source 28 can be any proven strain evaluation method for estimating the carbon fiber strain near the embedded insulated fiber 16. Examples of a suitable reference strain source 28 include but not are limited to traditional strain gage, fiber optical strain sensor, analytical modeling, numerical simulations, lamination theory, micromechanics for simple loading conditions, database from lab-tests of the composite structure itself or equivalent structure, predicted composite structural response to a given excitation loading (static or vibration force or temperature raise), etc. The reference strain source can either be passive measurement such as typical strain gage or an active strain generator such a piezoelectric actuator which can generate required strain by controlling its excitation voltage.

As the electrical resistance signal of the insulated fiber 16 could depend on its temperature and many applications of composite materials require the composite structure to experience different temperatures, a temperature measurement device 30 can be added to the system. Temperature measurement can be achieved by many different methods. For example, but not limited to, thermocouple, resistance thermometers, thermal infrared camera, analytical modeling, and numerical simulations are suitable for the purposes of the invention.

To use the insulated fiber sensor 10, the electrical resistance of the insulated fiber 16 needs to be correlated to different strains and temperatures. This relationship is recorded in database 32 and insulated fiber 16 needs to be calibrated before its signals can be used. Thus, to use the insulated fiber sensor 10, one must obtain the data of the electrical resistance of the insulated fiber 16, the reference strain, from reference strain source 28, and the temperature, from temperature measurement device 30.

By way of example only and not by way of limitation, Applicant has determined that the novel features of the invention lend themselves to several major uses Use 1—Calibrating the Relationship (or Database) of the Electrical Resistance of Embedded Insulated Fiber 16 Against the Reference Strain and the Temperature:

For a constant temperature process, one first collects the electrical resistance data of the insulated fiber 16 embedded in a composite 11 and the reference strain data from the reference strain source 28 and the temperature data of said temperature measurement device 30. An example procedure for building the relationship database can be, but are not limited to, the following steps. The relationship between the electrical resistance and the strain can be obtained at a specific constant temperature. If a non-constant temperature process is of interest, one can repeat the same procedure to calibrate the electrical resistance-strain relationships for several different temperatures. Many different numerical analysis methods such as interpolation method can also be used to get more data points from the existing calibration data points.

Use 2—Micro-Level Carbon Fiber Strain Monitoring at a Constant Temperature:

One can convert the measured electrical resistance of the embedded insulated fiber 16 to the micro-level carbon fiber strain during the use of the composite structure 11 by using the temperature information and the already calibrated database or relationship of the electrical resistance against different strains and temperatures.

Use 3—Micro-Level Carbon Fiber Strain Monitoring for Varying Temperature Applications:

For this case, both the electrical resistance of the insulated fiber embedded in the composite 11 and the corresponding temperature should be monitored and recorded against time. At each temperature data point, one can repeat the procedure described in Use 2 to calculate the strain.

Use 4—Residual Micro-Level Carbon Fiber Strain Monitoring During the Curing (or Solidification) Process:

During a curing (or solidification) process, the degree of cure (of solidification) of the matrix 14 is related to the temperature control cycle. For a pre-determined temperature control cycle, the temperature is specified as a function of time. For several specific time points during the process, the strain of a carbon fiber is either known by theory or can be determined by the reference strain source 28. Combining this reference information with (1) the temperature history and embedded insulated fiber 16 electrical resistance history during the curing (or solidification) process, (2) the calibrated electrical resistance relationship against temperature and strain for the embedded insulated fiber 16 in the cured composites, (3) the electrical resistance relationship against temperature and strain for a bare fiber 12, one can utilize numerical analysis skills to approximately calculate the embedded insulated fiber 16 residual strain development history during the curing (or solidification) process. The residual strain information can also be used to improve the accuracy of later measured strain variation history and the calibration database.

Use 5—Matrix Property Change or Matrix-Carbon Interaction Irregularity Monitoring:

One can frequently monitor the strain of the embedded insulated fiber 16 and the reference strain source 28 during the use of the composite structure 11. A sudden change of the strain from the embedded insulated fiber 16 or a suddenly rising difference between the strain measured by the embedded insulated fiber 16 and the strain from the reference strain source 28 could indicate a sudden irregular interaction between the fiber 12 and the surrounding matrix system 14. This irregular interaction could be, but is not limited to, matrix degradation, matrix softening (melting or reach the glass transition temperature), carbon fiber/matrix interface crack, carbon fiber sliding against matrix, etc.

Use 6—Investigate the Set Point of Matrix Property Change:

Similar to Use 5, one can either use Applicant's insulated fiber sensor 10 in either a composite laminate 11 or use it in the matrix 14 for just studying the matrix property change set point. One example of the use is to determine the glass transient temperature of a matrix 14. By gradually increasing (or decreasing) the temperature, a sudden irregular change in the insulated fiber 16 strain against the temperature may indicate that the glass transient temperature is reached.

Use 7—Health Monitoring of Composite Laminate:

One can frequently compare the micro-level carbon fiber strain signal from the embedded insulated fiber 16 against the reference strain source 28. If the difference between the two strain values is found to be way outside expected norms and base reference data, it could indicate the carbon fiber 12 is not transferring the load as it should do in normal uses. This can be caused by many things including but not limited to delamination, buckling of carbon fiber, damaged or broken carbon fibers, buckling of laminate or an individual lamina, matrix-carbon fiber interface failure, matrix failure, etc.

Use 8—Temperature Sensing:

It was found by Applicant that the electrical resistance change of the insulated fiber 16 responds to temperature change extremely fast (much faster then thermocouples). Therefore the insulated fiber 16 can be use to sense temperature change either being embedded in a composite laminate 11 or being used without the composite laminate 11. For situations when no significant change in strain can be assumed, the electrical resistance change can be completely tied to the temperature change.

Use 8—Analyzing the Micro-Level Carbon Fiber Strain, Matrix-Carbon Fiber Interface Behavior, Carbon Fiber Load Bearing Behavior, and Structure Integrity Responding to Mechanical or/and Thermal Loadings Applied to a Composite Structure:

In many complex application situations, such as bird impact on a composite aero-structure or suddenly raised temperature applied to a composite structure 11, the micro-level strain change of the carbon fiber 12, the interface behavior of matrix-carbon fiber, carbon fiber loading behavior, and structure integrity change are not easy to measure or predict.

Applicant's insulated fiber sensor 10 can help to experimentally analyze the micro-level carbon fiber strain, matrix-carbon fiber interface behavior, carbon fiber load bearing behavior, and structure integrity during a complex thermal or/and mechanical loading process. It can also be used in laboratory tests to study the comprehensive features of composite laminate specimen for the development or selection of appropriate ply sequences, carbon fibers, matrix, and/or manufacturing processes.

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:

1. An insulated fiber sensor apparatus comprising:
   a. a composite of a plurality of fibers in a matrix wherein each of said plurality of fibers has a first diameter that is approximately the same for each fiber;
   b. a single insulated carbon fiber with a first end and a second end, said single insulated fiber comprised of a single continuous and undivided fiber with a diameter approximately the same as said first diameter of said plurality of fibers and wherein said single continuous and undivided fiber has mechanical properties approximately the same as said plurality of fibers and wherein said single continuous and undivided fiber is covered with insulation such that said single insulated fiber has a second diameter and wherein said second diameter of said single insulated fiber is less than approximately eleven times the first diameter of the plurality of fibers, wherein said single insulated fiber is connected with said composite, and wherein said insulation separates said single insulated fiber from said matrix and from said plurality of fibers; and
   c. wherein the first end and the second end of said continuous and undivided single insulated fiber is conformed to connect with a measurement device for measuring the electrical resistance of said continuous and undivided single insulated fiber.

2. The apparatus of claim 1 further including more than one single insulated carbon fiber.

3. The apparatus of claim 2 wherein said more than one single insulated carbon fiber are located in different locations within said composite and are oriented in different directions than said plurality of fibers.

4. The apparatus of claim 1 further including a reference strain source connected with said composite.

5. The apparatus of claim 1 further including a temperature measurement device connected with said composite.

6. An insulated carbon fiber sensor apparatus comprising:
   a. a composite of a plurality of carbon fibers in a matrix wherein each of said plurality of fibers has a first diameter that is approximately the same for each fiber;
   b. a single insulated carbon fiber, with a first end and a second end, said single insulated carbon fiber comprised of a single continuous and undivided carbon fiber with a diameter approximately the same as said first diameter of said plurality of carbon fibers and wherein said single continuous and undivided carbon fiber has mechanical properties approximately the same as said plurality of carbon fibers and wherein said single continuous and undivided carbon fiber is covered with insulation such that said single insulated carbon fiber has a second diameter and wherein said second diameter of said single insulated carbon fiber is less than approximately eleven times the first diameter of the plurality of carbon fibers, wherein said single insulated carbon fiber is connected with said composite and wherein said insulation separates said single insulated carbon fiber from said matrix and from said plurality of carbon fibers; and
   c. an electrical resistance measurement device connected with said first end and the second end of said single continuous and undivided insulated carbon fiber for measuring the electrical resistance of said single continuous and undivided insulated carbon fiber.

7. The apparatus of claim 6 further including more than one single insulated carbon fiber.

8. The apparatus of claim 7 wherein said more than one single insulated carbon fibers are located in different locations within said composite and are oriented in different directions than said plurality of carbon fibers.

9. The apparatus of claim 6 further including a reference strain source connected with said composite.

10. The apparatus of claim 6 further including a temperature measurement device connected with said composite.

11. The apparatus of claim 6 wherein said single insulated carbon fiber is connected with said composite in one of a group of connections consisting of: attached with the surface of the composite or embedded within the composite.

12. The apparatus of claim 6 further including a database including measurements of said single insulated carbon fiber sensor prior to connection with said composite for comparison of measurements from said composite and measurements from said single insulated carbon fiber sensor after connection with said composite.

13. An insulated fiber sensor method comprising:
   a. providing composite consisting of a plurality of fibers in a matrix wherein each of said plurality of fibers has a first diameter that is approximately the same for each fiber, a single insulated carbon fiber with a first end and a second end, said single insulated fiber comprised of a single continuous and undivided fiber with a diameter approximately the same as said first diameter of said plurality of fibers and wherein said single continuous and undivided fiber has mechanical properties approximately the same as said plurality of fibers and wherein said single continuous and undivided fiber is covered with insulation such that said single insulated fiber has a second diameter and wherein said second diameter of said single insulated fiber is less than approximately eleven times the first diameter of the plurality of fibers, wherein said single, insulated fiber is connected with said composite, wherein said insulation separates said single insulated fiber from said matrix and from said plurality of fibers and a measurement device connected with said first end and the second end of said single continuous and undivided insulated fiber wherein said measurement device is conformed to measure electrical resistance of said single continuous and undivided insulated fiber; and
   b. collecting measurements from said measurement device.

14. The method of claim 13 further including a database wherein said database includes measurements of said single insulated fiber sensor prior to connection with said composite for comparison of measurements from said composite and measurements from said single insulated fiber sensor after connection with said composite.

15. The method of claim 14 further including a reference strain source connected with said composite and a temperature measurement device connected with said composite wherein data from said reference strain source and data from said temperature measurement device are collected in said database.

16. The method of claim 15 wherein measurements of said single insulated fiber include micro-level signals and data from said database is used to provide realtime data about strain, temperature and compression of said single insulated fiber and said matrix and said plurality of fibers and said composite.

17. The apparatus of claim 1 wherein said single insulated fiber has approximately equivalent micro-level behavior as said plurality of fibers in said composite.

18. The apparatus of claim 6 wherein said single insulated fiber has approximately equivalent micro-level behavior as said plurality of fibers in said composite.

* * * * *